US012756217B2

(12) United States Patent
Murakami

(10) Patent No.: US 12,756,217 B2
(45) Date of Patent: Oct. 6, 2026

(54) REDUNDANT POWER SUPPLY CONTROL DEVICE AND CONTROL METHOD

(71) Applicant: TOYOTA JIDOSHA KABUSHIKI KAISHA, Toyota (JP)

(72) Inventor: Makoto Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 544 days.

(21) Appl. No.: 18/490,249

(22) Filed: Oct. 19, 2023

(65) Prior Publication Data

US 2024/0213791 A1 Jun. 27, 2024

(30) Foreign Application Priority Data

Dec. 27, 2022 (JP) ................................ 2022-210211

(51) Int. Cl.
*H02J 7/00* (2026.01)
*H02J 7/80* (2026.01)

(52) U.S. Cl.
CPC ................ *H02J 7/865* (2026.01); *H02J 7/80* (2026.01)

(58) Field of Classification Search
CPC .................................. H02J 7/865; H02J 7/80
See application file for complete search history.

(56) References Cited

U.S. PATENT DOCUMENTS

| | | | | |
|---|---|---|---|---|
| 2020/0249281 | A1 | 8/2020 | Ishii et al. | |
| 2020/0298888 | A1 | 9/2020 | Ozeki et al. | |
| 2023/0222848 | A1 * | 7/2023 | Takahara .............. | G07C 5/008 701/31.4 |
| 2024/0201276 | A1 * | 6/2024 | Tsuda .................... | B60R 16/033 |

FOREIGN PATENT DOCUMENTS

| | | | |
|---|---|---|---|
| JP | 2013-208034 | A | 10/2013 |
| JP | 2020-051785 | A | 4/2020 |
| JP | 2020-125968 | A | 8/2020 |
| JP | 2020-156228 | A | 9/2020 |

* cited by examiner

*Primary Examiner* — Daniel Cavallari
(74) *Attorney, Agent, or Firm* — SoraIP, Inc.

(57) ABSTRACT

A redundant power supply control device controls a sub-battery capable of backing up the main battery. The control device includes an acquisition unit, an estimation unit, and a determination unit. The acquisition unit obtains a voltage value and a current value of the sub-battery. The estimation unit estimates the storage rate of the sub-battery by current integration. The determination unit determines whether the sub-battery can be backed up. The determination unit calculates a first resistance value that is an internal resistance value of the sub-battery estimated based on the measured voltage value and the measured current value, and calculates a second resistance value that is an internal resistance value of the sub-battery estimated based on the estimated voltage value and the measured current value. The determination unit determines whether the sub-battery can be backed up based on the larger one of the first resistance value and the second resistance value.

5 Claims, 5 Drawing Sheets

R = RESISTANCE VALUE

REDUNDANT POWER SUPPLY CONTROL DEVICE AND CONTROL METHOD

CROSS-REFERENCE TO RELATED APPLICATION

This application claims priority to Japanese Patent Application No. 2022-210211 filed on Dec. 27, 2022, incorporated herein by reference in its entirety.

BACKGROUND

1. Technical Field

The present disclosure relates to a control device and the like that controls a redundant power supply capable of backing up a main power supply.

2. Description of Related Art

Japanese Unexamined Patent Application Publication No. 2020-156228 (JP 2020-156228 A) discloses a vehicle battery control device. The battery control device determines whether a sub-battery that is a redundant power supply is capable of outputting backup power required to back up a main battery that is a main power supply during autonomous driving of a vehicle. In this vehicle battery control device, the sub-battery is subjected to a resistance detection process based on a predetermined pattern of charging and discharging. The battery control device uses the internal resistance value of the sub-battery calculated based on the changes in the voltage and the current of the sub-battery obtained by this resistance detection process to determine whether the sub-battery can output the power necessary to back up the main battery.

However, when the resistance detection process described in JP 2020-156228 A is performed while the sub-battery is polarized, an error occurs in the voltage value and the current value obtained by the resistance detection process. This may affect the determination of whether the sub-battery can output the power required to back up the main battery.

SUMMARY

The present disclosure has been made in view of the above issue. An object of the present disclosure is to provide a redundant power supply control device that can accurately determine whether the sub-battery is capable of outputting the power required to back up the main battery, regardless of whether the sub-battery is polarized.

In order to solve the above issue, in an aspect of the technique of the present disclosure, a redundant power supply control device that controls a sub-battery that is able to back up a main battery includes: an acquisition unit that acquires a voltage value and a current value of the sub-battery; an estimation unit that estimates a storage rate of the sub-battery by a current integration method; and a determination unit that determines whether the sub-battery is able to be backed up. The determination unit calculates a first resistance value that is an internal resistance value of the sub-battery estimated based on a measured voltage value and a measured current value acquired by the acquisition unit, calculates a second resistance value that is an internal resistance value of the sub-battery estimated based on an estimated voltage value derived from the storage rate estimated by the estimation unit and the measured current value, and determines whether the sub-battery is able to be backed up based on a larger resistance value of the first resistance value and the second resistance value.

According to the redundant power supply control device of the present disclosure, regardless of whether the sub-battery is polarized, it is possible to determine whether the sub-battery is able to output the power required to back up the main battery with high accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The control device of the present disclosure calculates the internal resistance of the redundant power supply in two ways, a measured value and a value estimated based on the current integration method, in order to suppress the influence of polarization occurring in the redundant power supply. The controller uses the larger of these calculated values to determine whether the redundant power supply is capable of backing up the main power supply in an emergency.

Hereinafter, an embodiment of the present disclosure will be described in detail with reference to the drawings.

EMBODIMENT

Configuration

Figure 1:
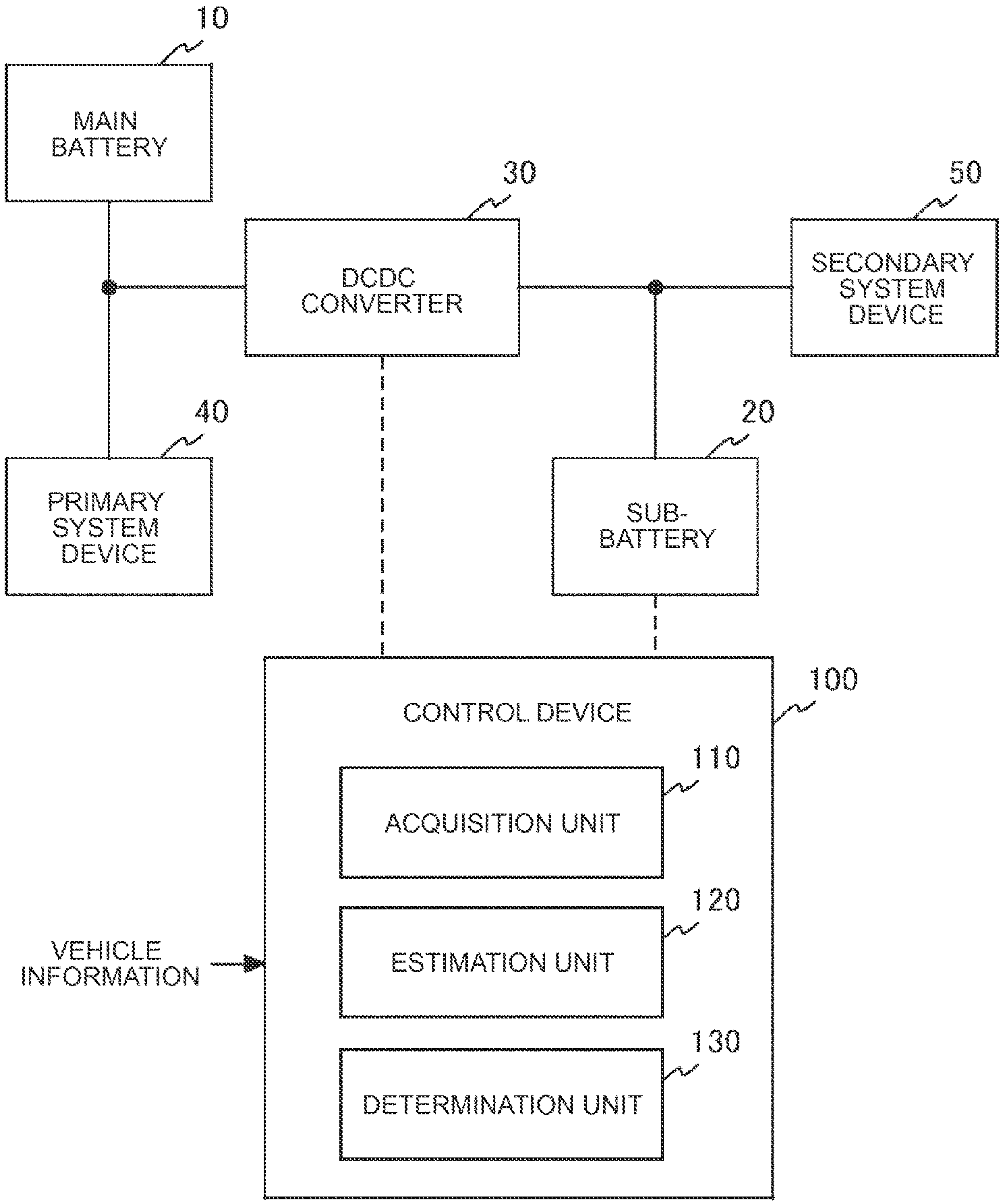
FIG. 1 is a functional block diagram of a redundant power supply control device and its peripherals according to an embodiment of the present disclosure.

FIG. 1 is a functional block diagram of a redundant power supply control device 100 and its peripherals according to an embodiment of the present disclosure. The functional block illustrated in FIG. 1 includes a main battery 10, a sub-battery 20, a DCDC converter 30, a primary system device 40, a secondary system device 50, and a control device 100. In FIG. 1, power lines through which power is transferred are indicated by solid lines. Signal lines through which control instructions and measured values flow are indicated by dashed lines.

Configurations such as the control device 100 shown in FIG. 1 are, for example, mounted on a vehicle such as a hybrid electric vehicle (HEV), plug-in hybrid electric vehicle (PHEV), and a battery electric vehicle (BEV) in which a function that requires the redundant power supply configuration such as autonomous driving is equipped.

The main battery 10 is a rechargeable secondary battery such as a lead-acid battery or a lithium-ion battery. The main battery 10 supplies the power stored by itself to the primary system device 40 and outputs it to the DCDC converter 30. Further, the main battery 10 can store electric power output by a generator such as an alternator (not shown).

Figure 2:
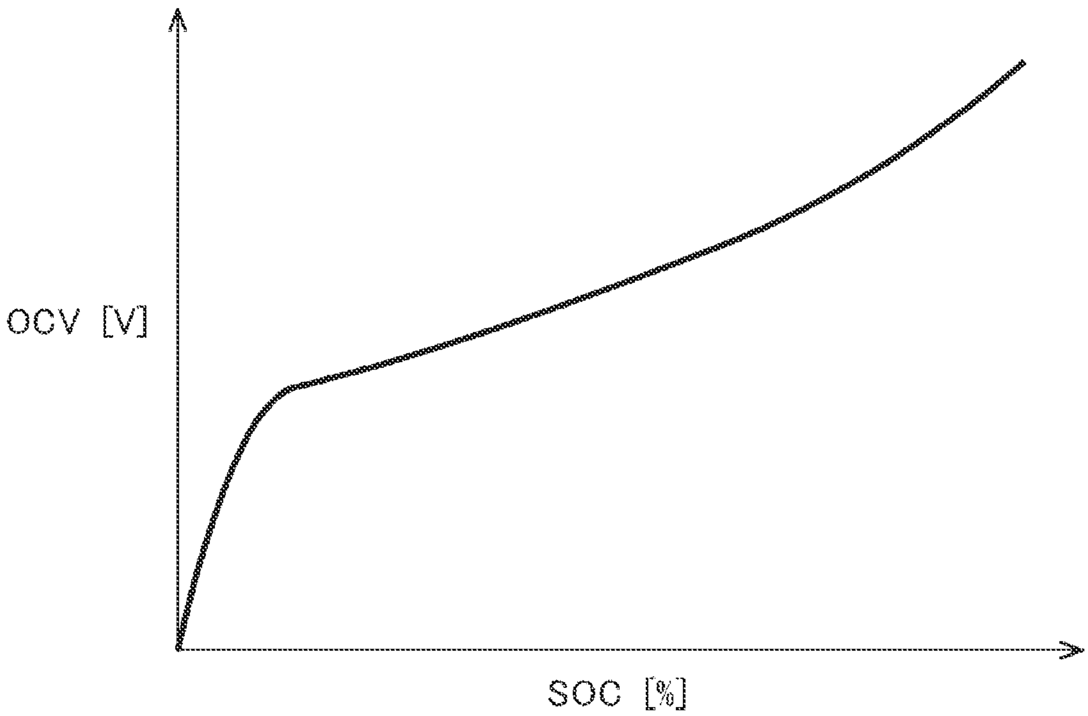
FIG. 2 is a diagram showing an example of the SOC-OCV characteristic curve of a sub-battery.

The sub-battery 20 is a rechargeable secondary battery such as a lead-acid battery or a lithium-ion battery. The sub-battery 20 stores power output from the main battery 10 via the DCDC converter 30 and supplies the power stored by itself to the secondary system device 50. The sub-battery 20 is controlled by the control device 100 to supply power to the secondary system device 50. The sub-battery 20 is provided redundantly (redundant power supply) so that backup processing is possible. As an example, even if the main battery 10, which is the main power supply, fails during automatic operation of the vehicle, the sub-battery 20 maintains (continues) power supply to the secondary system device 50 responsible for automatic operation instead of the main battery 10. This sub-battery 20 has a relationship between the state of charge (SOC) of the battery and the open circuit voltage (OCV) as illustrated in FIG. 2.

DCDC converter 30 is provided between main battery 10, sub battery 20 and secondary system device 50. The DCDC converter 30 is a voltage converter for converting the input voltage of the main battery 10 into a voltage necessary for the sub-battery 20 and the secondary system device 50 and outputting the same. For the DCDC converter 30, for example, a step-down DCDC converter that steps down the voltage of the main battery 10 (primary side) and outputs the voltage to the sub-battery 20 and the secondary system device 50 (secondary side) can be used.

The primary system device 40 is an in-vehicle device that operates on power supplied from the main battery 10 using the main battery 10 as a main power source. This primary system device 40 can be a device that does not particularly require a redundant power supply configuration.

The secondary system device 50 is an in-vehicle device that uses the main battery 10 as a main power source and the sub-battery 20 as a redundant power source. The secondary system device 50 operates on power supplied from the main battery 10 or power supplied from the sub battery 20 via the DCDC converter 30. The secondary system device 50 can be, for example, important in-vehicle equipment related to safe driving of the vehicle. Examples of important in-vehicle equipment include devices and systems that require a redundant power supply to perform so-called evacuation behavior, which is to stop the vehicle in a safe place in the event of an emergency such as a failure of the main power supply in automatic driving. Note that the secondary system device 50 May include equipment that does not require a redundant power supply configuration. Further, the secondary system device 50 includes in-vehicle equipment that may temporarily consume a large amount of power when the ignition switch is off (IG-OFF) such as when the vehicle is parked. In the present embodiment, it is possible to suppress the influence of the polarization that occurs in the sub-battery 20 due to the discharge that accompanies this temporary high power consumption on the judgment as to whether or not backup is possible.

Control device 100 is a device for determining whether sub-battery 20 is in a state in which backup processing of main battery 10 can be performed in an emergency. The control device 100 determines whether the sub-battery 20 can output power required for backing up the main battery 10 based on vehicle information (ignition switch ON/OFF state, manual operation/automatic operation state, etc.) acquired from vehicle-mounted equipment (not shown) and the battery state acquired from the sub-battery 20. This control device 100 includes an acquisition unit 110, an estimation unit 120 and a determination unit 130.

Acquisition unit 110 acquires a physical quantity indicating the state of sub-battery 20. Physical quantities that indicate the state of the sub-battery 20 are, for example, voltage, current, and temperature. Acquisition unit 110 acquires a physical quantity indicating the state of sub-battery 20 by acquiring a value detected by a detection device (not shown) such as a sensor mounted on the vehicle. In the present embodiment, the acquisition unit 110 obtains at least the voltage value (hereinafter referred to as "measured voltage value") and the current value (hereinafter referred to as "measured current value") of the sub-battery 20.

The estimation unit 120 estimates the power storage rate of the sub-battery 20. A well-known method can be used for estimating the charge rate of the sub-battery 20. As a method for estimating the charge rate, when the charge and discharge of the sub-battery 20 are intentionally made while the ignition switch is off (IG-OFF) such as when the vehicle is parked, and the storage rate is greatly changed, a "current integration method" can be exemplified for estimating the charging rate from the value obtained by integrating the current discharged or charged.

The determination unit 130 determines whether the sub-battery 20, which is a redundant power supply, is in a state capable of outputting predetermined backup power to the secondary system device 50 when the main battery 10, which is a main power supply, fails. This determination is performed based on the internal resistance value of the sub-battery 20 estimated based on the measured voltage value acquired by the acquisition unit 110 and the internal resistance value of the sub-battery 20 estimated based on the voltage value derived from the charge rate estimated by the estimation unit 120 (hereinafter referred to as "estimated voltage value") (described later). For derivation of the internal resistance value, a well-known method such as finding the slope from a combination of the voltage value and the current value of the sub-battery 20 can be used.

A part or all of this control device 100 can typically be configured by an Electronic Control Unit (ECU) including a processor such as a microcomputer, a memory, an input/output interface, and the like. In this electronic control device, the processor reads out and executes a program stored in the memory, thereby realizing some or all of the functions performed by the respective components of the acquisition unit 110, the estimation unit 120, and the determination unit 130 described above.

Control

Next, control performed by the control device 100 according to the present embodiment will be described with further reference to FIGS. 3, 4, 5, and 6.

Figure 3:
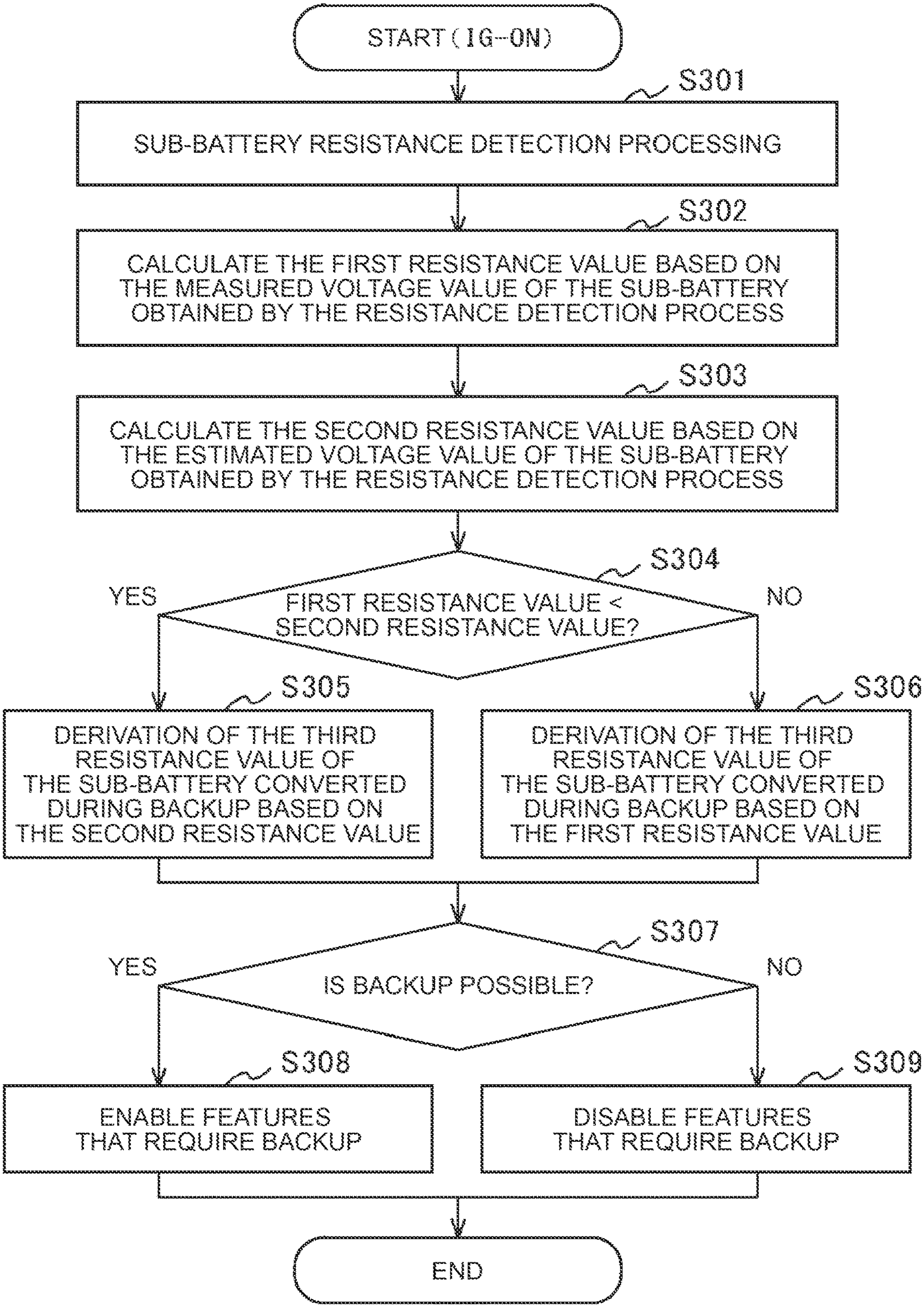
FIG. 3 is a flowchart for explaining the processing procedure of backup availability determination control executed by the redundant power supply control device.

FIG. 3 is a flowchart for explaining the processing procedure of backup availability determination control for the sub-battery 20 executed by the determination unit 130 of the control device 100. The backup availability determination control for the sub-battery 20 illustrated in FIG. 3 is started, for example, when the ignition switch of the vehicle is turned on (IG-ON).

S301

Figure 4:
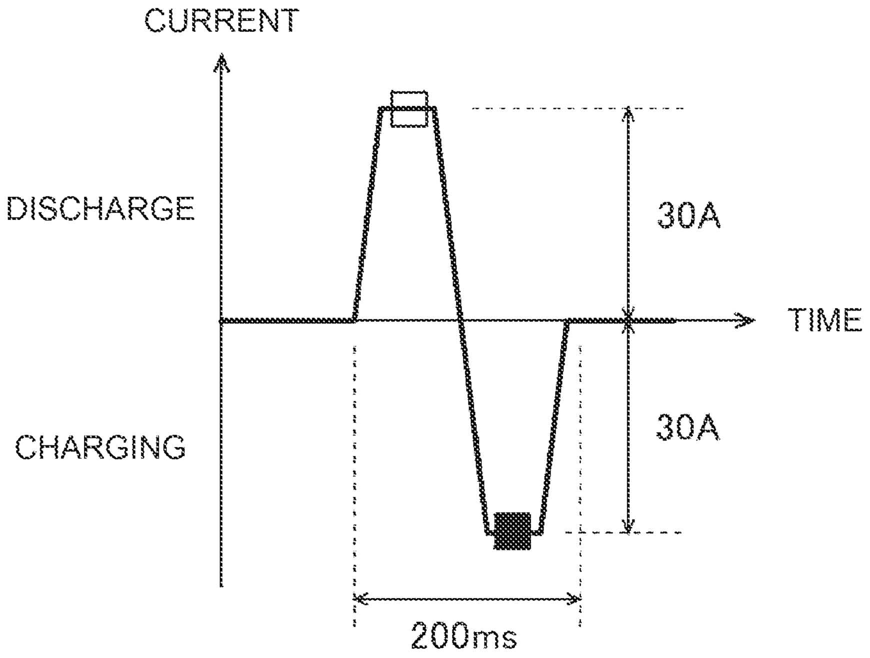
FIG. 4 is an example of pulses used in the sub-battery resistance detection process.

The determination unit 130 performs resistance detection processing for obtaining the internal resistance value of the sub-battery 20. FIG. 4 shows an example of pulses used in the process of detecting the resistance of the sub-battery 20. This resistance detection process is performed by charging and discharging the sub-battery 20 using a single pulse having a period of 200 milliseconds and an amplitude of ±30 amperes as shown in FIG. 4, for example. The determination unit 130 monitors the voltage, current, and charge rate of the sub-battery 20 that change due to charging/discharging using this single pulse. After the determination unit 130 performs the resistance detection process of the sub battery 20, the process proceeds to S302.

S302

Figure 5:
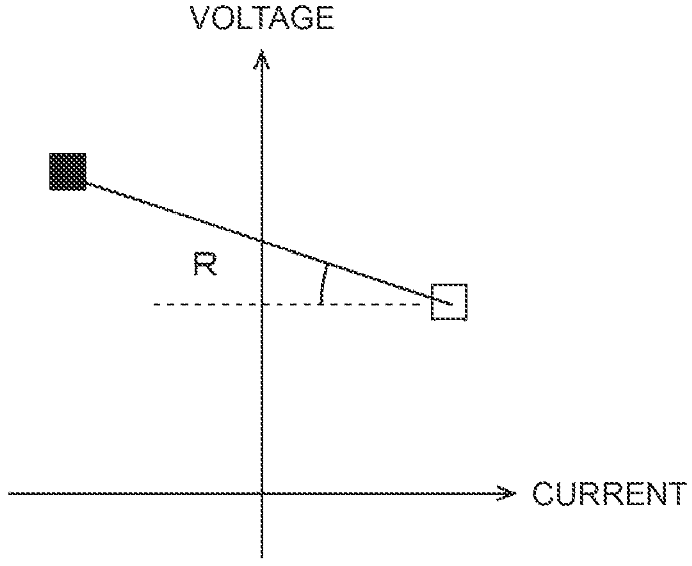
FIG. 5 is an example of pulses used in the sub-battery resistance detection process.

Based on the measured voltage value, which is the actual voltage value of the sub battery 20, and the measured current value, which is the actual current value, obtained by the acquisition unit 110 in the process of detecting the resistance of the sub battery 20, the determination unit 130 determines whether the sub battery 20 internal resistance value (hereinafter referred to as "first resistance value") is calculated. FIG. 5 shows an example of a method for calculating the internal resistance value of the sub-battery 20. For example, as shown in FIG. 5, the determination unit 130 plots the set of the measured voltage value and the measured current value at the discharge peak (white squares "□") and the set of the measured voltage value and the measured current value at the charge peak (filled squares "■") in FIG. 4 on the voltage-current orthogonal coordinate system. The determination unit 130 can calculate the slope of the straight line passing through the two plotted coordinates as the first resistance value. If there are three or more plotted coordinates, the first resistance value can be calculated from the slope of the approximate straight line obtained by using the method of least squares or the like. After the determination unit 130 calculates the first resistance value of the sub-battery 20, the process proceeds to S303.

S303

The determination unit 130 determines an estimated voltage value derived from the charge rate estimated by estimation unit 120 in the resistance detection process of sub-battery 20 and a measured current value that is the actual current value of sub-battery 20, the internal resistance value (hereinafter referred to as "second resistance value") of the sub-battery 20 is calculated. The estimated voltage value can be derived by obtaining the voltage value corresponding to the charge rate estimated by the estimation unit 120 in the SOC-OCV characteristic curve of the sub-battery 20 illustrated in FIG. 2. Note that it may be difficult to derive the voltage value from the charge rate with high accuracy, such as an iron phosphate-based lithium ion battery (LFP battery) having a so-called flat region. In the case of such a battery, a map that enables the current voltage value of the sub-battery 20 to be estimated from the current integrated value is created in advance, and the estimated voltage value can be derived from this map. The map may be held by the determination unit 130 or may be stored in a storage unit (not shown).

Using this estimated voltage value as a reference, as shown in FIG. 5, determination unit 130 determines the estimated voltage derived from the measured current value at the discharge peak (white squares "□") in FIG. 4 and the charge rate that changes due to discharge. A set of values and a set of estimated voltage values derived from the measured current value at the charging peak (black squares "■") and the charge rate that changes with charging are plotted on a voltage-current orthogonal coordinate system. The determination unit 130 can calculate the slope of the straight line passing through the two plotted coordinates as the second resistance value. If there are three or more plotted coordinates, the second resistance value can be calculated from the slope of the approximate straight line obtained by using the method of least squares or the like. After the determination unit 130 calculates the second resistance value of the sub-battery 20, the process proceeds to S304.

S304

The determination unit 130 compares the first resistance value calculated based on the measured voltage value and the second resistance value calculated based on the estimated voltage value. Determination unit 130 determines which of the first resistance value and the second resistance value is greater. It can be estimated that the difference between the first resistance value and the second resistance value is the error due to the polarization of the sub-battery 20. By judging the magnitude of this resistance value, it becomes possible to judge whether or not backup is possible on the safer side.

If the determination unit 130 determines that the first resistance value is smaller than the second resistance value (first resistance value<second resistance value) (Yes in S304), the process proceeds to S305. On the other hand, if the determination unit 130 determines that the first resistance value is equal to or greater than the second resistance value (first resistance valuesecond resistance value) (S304, No), the process proceeds to S306.

S305

As a result of comparing the first resistance value and the second resistance value, the determination unit 130 derives the internal resistance value of the sub-battery 20 converted when backing up the main battery 10 (hereinafter referred to as "third resistance value") based on the second resistance value determined to be large. In a case where the power pattern (or the current pattern) required as backup is a pattern that outputs "x amperes for y seconds" when the resistance detection process is performed using the single pulse (left view in FIG. 4) that outputs "±30 amperes for 200 milliseconds" in S301, for example, the third resistance value can be derived by calculation such as multiplying the second resistance value obtained in the resistance detection process by a coefficient for converting "±30 amperes for 200 milliseconds" to "x amperes for y seconds. Alternatively, a map that associates the necessary power pattern with the third resistance value is prepared in advance as a backup, and the determination unit 130 refers to this map to derive the third resistance value from the second resistance value. Also good (map drawing). The map may be held by the determination unit 130 or may be stored in a storage unit (not shown). Note that the number of power patterns required as a backup is not limited to one and may be plural. If there is a plurality of power patterns required as backup, the resistance value that allows the vehicle to be controlled to the safest side is adopted as the third resistance value. When the determination unit 130 derives the third resistance value of the sub-battery 20 based on the second resistance value, the process proceeds to S307.

S306

As a result of comparing the first resistance value and the second resistance value, the determination unit 130 derives the third resistance value of the sub battery 20 converted when backing up the main battery 10 based on the first resistance value determined to be larger. The method for deriving the third resistance value is the same as the method described in S305 above. When the determination unit 130 derives the third resistance value of the sub-battery 20 based on the first resistance value, the process proceeds to S307.

S307

The determination unit 130 determines whether the sub-battery 20 can back up the main battery 10 based on the third resistance value of the sub-battery 20 derived in S305 or S306. This determination is made based on whether the final voltage value of the sub-battery 20, which takes into account the voltage drop due to the supply of the backup current, satisfies the lower limit voltage value required of the power supply for performing backup. More specifically, it is determined by whether the following formula [1] is satisfied.

$$\text{Lower limit voltage value} < \text{Measured voltage value} - \text{Third resistance value} \times \text{Backup current} \quad [1]$$

If the determination unit 130 determines that the sub battery 20 can back up the main battery 10 (S307, YES), the process proceeds to S308. On the other hand, if the determination unit 130 determines that the sub battery 20 cannot back up the main battery 10 (S307, No), the process proceeds to S309.

S308

The determination unit 130 enables (permits) a function that requires backup of the redundant power supply by the sub-battery 20. For example, the determination unit 130 enables an automatic driving function of the vehicle. When the determination unit 130 enables the function that requires backup, the backup availability determination control for the sub-battery 20 ends.

S309

The determination unit 130 disables (prohibits) the function that requires backup of the redundant power supply by the sub-battery 20. For example, the determination unit 130 disables the automatic driving function of the vehicle. Disable means that the automatic driving function is not executed even if an automatic driving request is generated by the driver's instruction. When the determination unit 130 disables the function that requires backup, the backup availability determination control for the sub-battery 20 ends.

Figure 6:
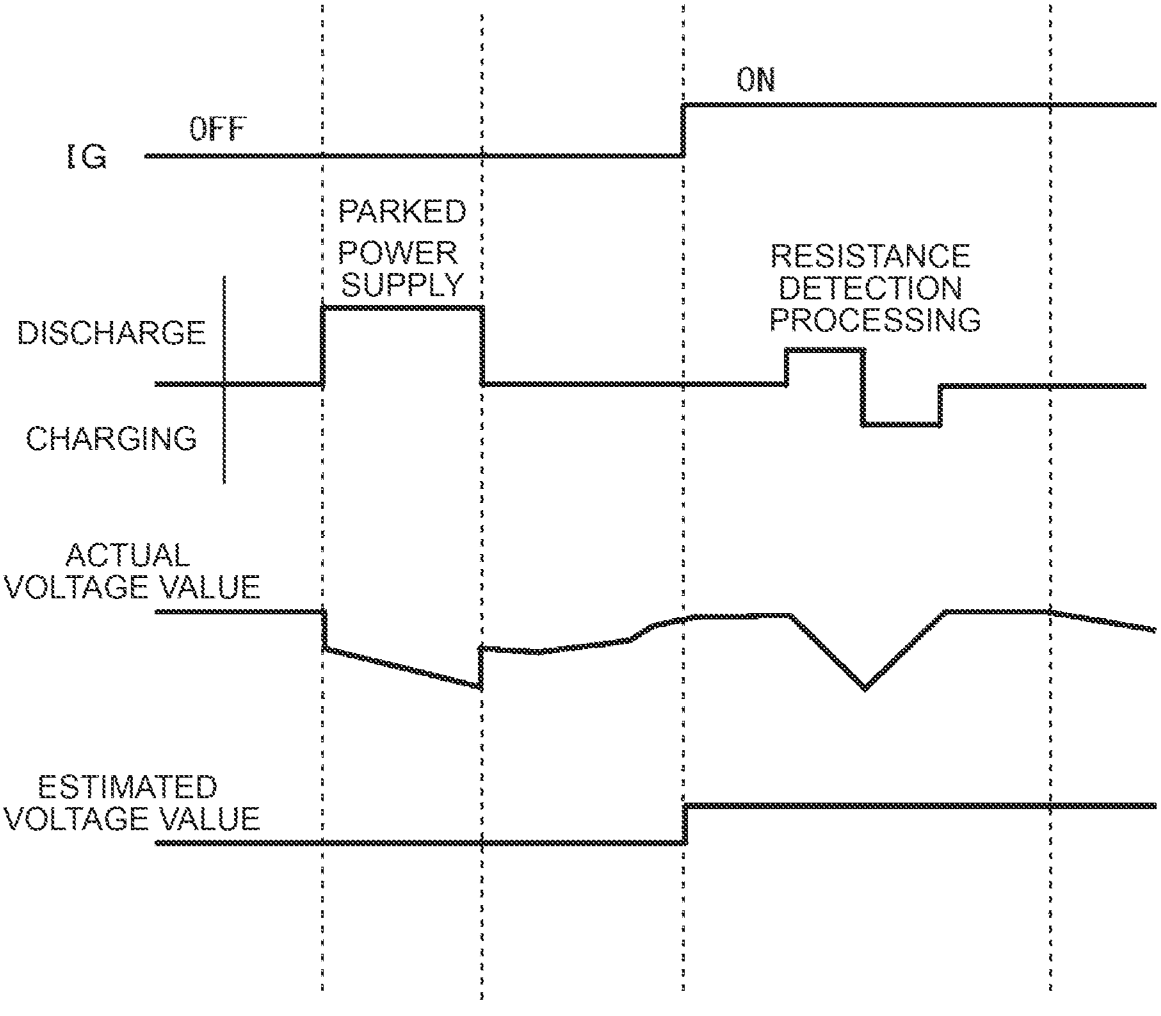
FIG. 6 is a timing chart for explaining backup availability determination control in FIG. 3.

FIG. 6 shows an example of changes in the voltage and current of the sub-battery 20 when backup availability determination control for the sub-battery 20 is executed when the sub-battery 20 is polarized due to power supply while the vehicle is parked.

Operations and Effects

The redundant power supply control device 100 according to the embodiment of the present disclosure described above uses the two resistance values, which are the first resistance value estimated based on the measured voltage value (and the measured current value) of the sub-battery 20 as the internal resistance value of the sub-battery 20, and a second resistance value estimated based on the estimated voltage value (and the measured current value) derived from the charge rate. Control device 100 uses the larger one of the first resistance value and the second resistance value to determine whether or not sub-battery 20 is capable of outputting the power required to back up main battery 10.

With this determination process, even if the ignition switch of the vehicle is turned on at the timing when the sub-battery 20 is polarized and the resistance detection process is executed, the influence of the voltage error due to polarization can be suppressed. Therefore, regardless of whether or not the sub-battery 20 is polarized, it is possible to accurately determine whether the sub-battery 20 is capable of outputting the power required to back up the main battery 10. That is, it is possible to suppress the determination that backup of the main power supply is possible in a situation where the backup capacity of the redundant power supply is insufficient.

An embodiment of the present disclosure has been described above, but the present disclosure includes not only the redundant power supply control device described above, but also a method for controlling a redundant power supply executed by a control device having a processor and a memory, and a program for the method, a computer-readable non-temporary recording medium storing the program, or a vehicle equipped with a control device.

The redundant power supply control device of the present disclosure can be used in a vehicle or the like equipped with a redundant power supply that backs up the main power supply.

What is claimed is:

1. A redundant power supply control device that controls a sub-battery that is able to back up a main battery, the redundant power supply control device comprising:
- an acquisition unit that acquires a voltage value and a current value of the sub-battery;
- an estimation unit that estimates a storage rate of the sub-battery by a current integration method; and
- a determination unit that determines whether the sub-battery is able to be backed up, wherein the determination unit
- calculates a first resistance value that is an internal resistance value of the sub-battery estimated based on a measured voltage value and a measured current value acquired by the acquisition unit,
- calculates a second resistance value that is an internal resistance value of the sub-battery estimated based on an estimated voltage value derived from the storage rate estimated by the estimation unit and the measured current value, and
- determines whether the sub-battery is able to be backed up based on a larger resistance value of the first resistance value and the second resistance value.

2. The redundant power supply control device according to claim 1, wherein the determination unit
- performs charging and discharging in a predetermined pattern in the sub-battery, and
- calculates the first resistance value and the second resistance value based on changes in a voltage, a current, and the storage rate of the sub-battery while the charging and the discharging are performed.

3. The redundant power supply control device according to claim 2, wherein the determination unit
- derives a third resistance value that is an internal resistance value of the sub-battery converted when backup power is supplied, based on the larger resistance value, and
- determines whether the sub-battery is able to be backed up based on the voltage value of the sub-battery calculated from the measured voltage value and an amount of the voltage that drops due to the third resistance value when the backup power is supplied.

4. The redundant power supply control device according to claim 3, wherein the determination unit
- stores one or more maps indicating an internal resistance value of the sub-battery based on a combination of a backup current according to a predetermined power pattern and a time period during which the backup current is supplied, and
- derives the third resistance value from a map corresponding to the larger resistance value among the one or more maps.

5. A control method executed by a control device that controls a sub-battery that is able to back up a main battery, the control method comprising:
- a step of acquiring a voltage value and a current value of the sub-battery;
- a step of acquiring a storage rate of the sub-battery estimated by a current integration method;
- a step of estimating a first resistance value that is an internal resistance value of the sub-battery based on a measured voltage value and a measured current value of the sub-battery;

a step of estimating a second resistance value that is an internal resistance value of the sub-battery based on an estimated voltage value derived from the storage rate of the sub-battery and the measured current value; and a step of determining whether the sub-battery is able to be backed up based on a larger resistance value of the first resistance value and the second resistance value.

* * * * *